United States Patent
Nakanishi et al.

(10) Patent No.: US 11,261,324 B2
(45) Date of Patent: Mar. 1, 2022

(54) RESIN COMPOSITION INCLUDING A POLYCARBONATE RESIN AND A FLUORINE-CONTAINING POLYMER, AND MOLDED ARTICLE

(71) Applicants: DAIKIN INDUSTRIES, LTD., Osaka (JP); TEIJIN LIMITED, Osaka (JP)

(72) Inventors: Koji Nakanishi, Osaka (JP); Masaji Komori, Osaka (JP); Hideki Kono, Osaka (JP); Shunsuke Okuzawa, Osaka (JP); Toshiyuki Miyake, Osaka (JP)

(73) Assignees: DAIKIN INDUSTRIES, LTD., Osaka (JP); TEIJIN LIMITED, Osaka (JP)

( * ) Notice: Subject to any disclaimer, the term of this patent is extended or adjusted under 35 U.S.C. 154(b) by 6 days.

(21) Appl. No.: 16/626,130

(22) PCT Filed: Jun. 25, 2018

(86) PCT No.: PCT/JP2018/024054
§ 371 (c)(1),
(2) Date: Dec. 23, 2019

(87) PCT Pub. No.: WO2019/004145
PCT Pub. Date: Jan. 3, 2019

(65) Prior Publication Data
US 2020/0123377 A1    Apr. 23, 2020

(30) Foreign Application Priority Data
Jun. 28, 2017 (JP) .............................. JP2017-126051

(51) Int. Cl.
*C08L 69/00* (2006.01)
*C08L 27/18* (2006.01)
*C08L 27/20* (2006.01)

(52) U.S. Cl.
CPC ............. *C08L 69/00* (2013.01); *C08L 27/18* (2013.01); *C08L 27/20* (2013.01)

(58) Field of Classification Search
None
See application file for complete search history.

(56) References Cited

U.S. PATENT DOCUMENTS

| 4,749,752 A | * | 6/1988 | Youlu | C08L 27/18 524/406 |
| 5,159,019 A | * | 10/1992 | Yamamoto | C08L 81/02 525/189 |
| 2014/0371378 A1 | | 12/2014 | Zheng et al. | |
| 2016/0185995 A1 | | 6/2016 | Mugisawa | |

FOREIGN PATENT DOCUMENTS

| CN | 105324435 A | | 2/2016 |
| JP | 61-57645 A | | 3/1986 |
| JP | 61057645 | * | 3/1986 |
| JP | 63-213555 A | | 9/1988 |
| JP | 05-171025 A | | 7/1993 |
| JP | 06-313087 A | | 11/1994 |
| JP | 8-328286 A | | 12/1996 |
| JP | 2001-226576 A | | 8/2001 |
| JP | 2007-522613 A | | 8/2007 |
| JP | 2010-180365 A | | 8/2010 |
| JP | 2015-182381 A | | 10/2015 |
| WO | 2005/073984 A1 | | 8/2005 |

OTHER PUBLICATIONS

Plastics ULProspector webpage for Polycarbonate; (2016) pp. 1-7. (Year: 2016).*
International Preliminary Report on Patentability dated Dec. 31, 2019 from the International Bureau in International Application No. PCT/JP2018/024054.
International Search Report for PCT/JP2018/024054 dated Sep. 25, 2018 (PCT/ISA/210).
Extended European Search Report dated Dec. 18, 2020 from the European Patent Office in EP Application No. 18824108.7.

* cited by examiner

*Primary Examiner* — David J Buttner
(74) *Attorney, Agent, or Firm* — Sughrue Mion, PLLC

(57) ABSTRACT

A resin composition containing a polycarbonate resin and a fluorine-containing copolymer. The fluorine-containing copolymer is a copolymer containing a polymerized unit based on tetrafluoroethylene in an amount of 75% by mass or more of all polymerized units and at least one selected from a polymerized unit based on hexafluoropropylene and a polymerized unit based on a perfluoro(alkyl vinyl ether) in an amount of 2% by mass or more. Also disclosed is a molded article formed from the resin composition, the polycarbonate resin constituting a continuous phase and the fluorine-containing copolymer constituting a dispersed phase having an average particle size of 0.01 to 2.5 µm.

5 Claims, No Drawings

RESIN COMPOSITION INCLUDING A POLYCARBONATE RESIN AND A FLUORINE-CONTAINING POLYMER, AND MOLDED ARTICLE

CROSS REFERENCE TO RELATED APPLICATIONS

This application is a National Stage of International Application No. PCT/JP2018/024054 filed Jun. 25, 2018, claiming priority based on Japanese Patent Application No. 2017-126051 filed Jun. 28, 2017.

TECHNICAL FIELD

The Invention relates to resin compositions and molded articles.

BACKGROUND ART

Polycarbonate resins have excellent mechanical properties and thermal properties and are therefore used in a wide variety of fields such as the OA equipment field, electronic/electrical equipment field, and the automobile field. In order to improve various properties of polycarbonate resins, blending a polycarbonate resin with another resin has been examined recently.

For example, Patent Literature 1 aims to provide a polycarbonate resin composition having high chemical resistance, and proposes a resin composition containing 2 to 40% by weight of a thermoplastic fluororesin having a melting point of 150° C. to 230° C. mixed with a polycarbonate resin. Still, this patent literature fails to disclose improvement of fluidity in a molten state and of incombustibility.

Patent Literature 2 aims to develop a polycarbonate resin composition having excellent incombustibility, maintaining mechanical strength, and having excellent slidability and solvent resistance, and proposes a polycarbonate resin composition containing (A) 1 to 99% by weight of a specific polycarbonate-polyorganosiloxane copolymer and (B) 99 to 1% by weight of a fluororesin. Still, this patent literature fails to disclose improvement of fluidity in a molten state and of impact resistance at low temperature.

Patent Literature 3 aims to give incombustibility to a polycarbonate resin and to prevent dripping, and discloses addition of a fluororesin (especially PTFE). Unfortunately, this patent literature shows that adding 5 parts by weight or more of a fluororesin causes insufficient dispersion, reducing the mechanical strength and processing fluidity of the resin. This demonstrates that an alloy of a polycarbonate resin and a fluororesin has difficulty in simultaneously achieving the incombustibility, the mechanical properties, and the fluidity.

Patent Literature 4 proposes adding a PTFE fluororesin to improve the sliding properties. Still, reducing the dispersed particle size of the PTFE fluororesin has its limit and excessive reduction may cause malfunction in the molding process.

Patent Literature 5 discloses a resin composition with improved char formability and ink printability achieved by adding a large amount of an inorganic compound and a small amount of a polycarbonate resin to a perfluoropolymer for plenum cables. Still, this patent literature fails to disclose that this resin composition has mechanical strength sufficient for a resin composition.

CITATION LIST

Patent Literature

Patent Literature 1: JP H05-171025 A
Patent Literature 2: JP H06-313087 A
Patent Literature 3: JP 2001-226576 A
Patent Literature 4: JP S63-213555 A
Patent Literature 5: JP 2007-522613 T

SUMMARY OF INVENTION

Technical Problem

Polycarbonate resin compositions excellent in a wider variety of properties have been awaited recently.

In view of the above current state of the art, the invention aims to provide a resin composition that can have excellent fluidity and that can provide a molded article having excellent tensile properties, flexural properties, low-temperature impact resistance, and incombustibility.

Solution to Problem

The invention relates to a resin composition containing a polycarbonate resin and a fluorine-containing copolymer, the fluorine-containing copolymer being a copolymer containing a polymerized unit based on tetrafluoroethylene in an amount of 75% by mass or more of all polymerized units and at least one selected from the group consisting of a polymerized unit based on hexafluoropropylene and a polymerized unit based on a perfluoro(alkyl vinyl ether) in an amount of 2% by mass or more of all polymerized units.

The fluorine-containing copolymer preferably includes at least one selected from the group consisting of: a copolymer containing the polymerized unit based on tetrafluoroethylene in an amount of 92 to 80% by mass of all polymerized units and the polymerized unit based on hexafluoropropylene in an amount of 8 to 20% by mass of all polymerized units; a copolymer containing the polymerized unit based on tetrafluoroethylene in an amount of 98 to 90% by mass of all polymerized units and the polymerized unit based on a perfluoro(alkyl vinyl ether) in an amount of 2 to 10% by mass of all polymerized units; and a copolymer containing the polymerized unit based on tetrafluoroethylene in an amount of less than 92% by mass to 75% by mass of all polymerized units, the polymerized unit based on hexafluoropropylene in an amount of 8 to 20% by mass of all polymerized units, and the polymerized unit based on a perfluoro(alkyl vinyl ether) in an amount of more than 0% by mass to 5% by mass of all polymerized units.

The fluorine-containing copolymer preferably has a melt flow rate of 0.1 to 100 g/10 min at 300° C.

In the resin composition, preferably, the polycarbonate resin constitutes a continuous phase and the fluorine-containing copolymer constitutes a dispersed phase.

The dispersed phase preferably has an average particle size of 0.01 to 2.5 µm.

The resin composition preferably has a melt flow rate of 1 to 200 g/10 min at 300° C.

The invention also relates to a molded article formed from the above resin composition, the polycarbonate resin constituting a continuous phase and the fluorine-containing copolymer constituting a dispersed phase, the dispersed phase having an average particle size of 0.01 to 2.5 µm.

Advantageous Effects of Invention

The resin composition of the invention has any of the above structures. Therefore, the resin composition of the invention can have excellent fluidity and can provide a molded article having excellent tensile properties, flexural properties, low-temperature impact resistance, and incombustibility.

DESCRIPTION OF EMBODIMENTS

The invention is described in detail below.

The resin composition of the invention contains a polycarbonate resin.

The polycarbonate resin is a polymer containing a carbonate group and may be an aromatic polycarbonate resin or an aliphatic polycarbonate resin, for example. Preferred among these is an aromatic polycarbonate resin. One of these polycarbonate resins may be used alone, or two or more thereof may be used in combination.

For example, the aromatic polycarbonate resin may be one having a repeating unit structure represented by the following formula:

[Chem. 1]

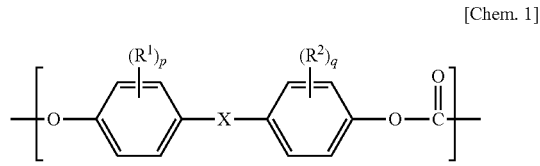

wherein $R^1$ and $R^2$ are each individually a hydrogen atom, a C1-C6 alkyl group, a C5-C7 cycloalkyl group, a C6-C12 aryl group, or a halogen atom; p and q are each individually an integer of 0 to 4; X is a direct bond, O, S, SO, $SO_2$, $CR^3R^4$ (wherein $R^3$ and $R^4$ are each individually a hydrogen atom, a C1-C6 alkyl group, or a C6-C12 aryl group, and may be the same as or different from each other), a C5-C11 cycloalkylidene group, a C2-C10 alkylene group, a polydimethylsiloxane group, or $C(CF_3)_2$.

Examples of the alkyl group for $R^1$ and $R^2$ include methyl, ethyl, n-propyl, isopropyl, n-butyl, sec-butyl, tert-butyl, isobutyl, n-pentyl, isopentyl, sec-pentyl, tert-pentyl, neopentyl, n-hexyl, isohexyl, sec-hexyl, tert-hexyl, neohexyl, and cyclopentylmethyl groups. Examples of the cycloalkyl group include cyclopentyl, cyclohexyl, methylcyclopentyl, cycloheptyl, methylcyclohexyl, dimethylcyclopentyl, and ethylcyclopentyl groups. Examples of the aryl group include phenyl, methylphenyl, ethylphenyl, propylphenyl, butylphenyl, dimethylphenyl, trimethylphenyl, cyclohexylphenyl, 4-biphenyl, 3-biphenyl, 1-naphthyl, 2-naphthyl, methylnaphthyl, dimethylnaphthyl, and ethylnaphthyl groups. Examples of the halogen atom include fluorine, chlorine, bromine, and iodine atoms.

Examples of the alkyl group for $R^3$ and $R^4$ in $CR^3R^4$ include methyl, ethyl, n-propyl, isopropyl, n-butyl, sec-butyl, tert-butyl, isobutyl, n-pentyl, isopentyl, sec-pentyl, tert-pentyl, neopentyl, n-hexyl, isohexyl, sec-hexyl, tert-hexyl, neohexyl, and cyclopentylmethyl groups. Examples of the cycloalkyl group include cyclopentyl, cyclohexyl, methylcyclopentyl, cycloheptyl, methylcyclohexyl, dimethylcyclopentyl, and ethylcyclopentyl groups. Examples of the aryl group include phenyl, methylphenyl, ethylphenyl, propylphenyl, butylphenyl, dimethylphenyl, trimethylphenyl, cyclohexylphenyl, 4-biphenyl, 3-biphenyl, 1-naphthyl, 2-naphthyl, methylnaphthyl, dimethylnaphthyl, and ethylnaphthyl groups.

From the viewpoints of easy availability and cost, $R^1$ and $R^2$ are each preferably a hydrogen atom and X is preferably $CR^3R^4$ wherein $R^3$ and $R^4$ are each a methyl group or a hydrogen atom.

The aromatic polycarbonate resin is particularly preferably one having a repeating unit structure represented by the following formula.

[Chem. 2]

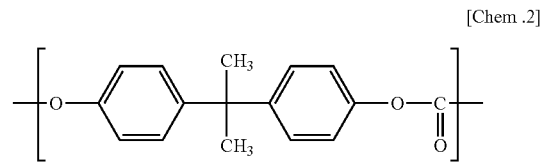

The aromatic polycarbonate resin can be produced by a known production method, such as interfacial polymerization, melt transesterification, solid-phase transesterification, or ring-opening polymerization of a cyclic carbonate compound. The materials of the aromatic polycarbonate resin to be used in a known production method include a dihydric phenol and phosgene or diphenyl carbonate, for example.

The aliphatic polycarbonate resin may be one containing a C2-C12 aliphatic carbonate in the repeating unit. Examples thereof include polyethylene carbonate, polypropylene carbonate, polytrimethylene carbonate, polytetramethylene carbonate, polypentamethylene carbonate, polyhexamethylene carbonate, polyheptamethylene carbonate, polyoctamethylene carbonate, polynonamethylene carbonate, polydecamethylene carbonate, polyoxydiethylene carbonate, poly-3,6-dioxyoctane carbonate, poly-3,6,9-trioxyundecane carbonate, polyoxydipropylene carbonate, polycyclopentene carbonate, and polycyclohexene carbonate.

The aliphatic polycarbonate resin can be produced by a known production method, such as copolymerization of carbon dioxide and an epoxide in the presence of a metal catalyst.

The polycarbonate resin may preferably have a viscosity average molecular weight of $1\times10^4$ to $5\times10^4$, still more preferably $1.5\times10^4$ to $4\times10^4$, particularly preferably $2\times10^4$ to $3\times10^4$, although not limited thereto.

An aromatic polycarbonate resin having a viscosity average molecular weight lower than $1\times10^4$ may have difficulty in achieving good mechanical properties. An aromatic polycarbonate resin having a viscosity average molecular weight higher than $5\times10^4$ may have poor versatility in that it may have poor fluidity in injection molding.

The viscosity average molecular weight as used herein means the value calculated as follows. First, 0.7 g of a polycarbonate resin is dissolved in 100 mL of methylene chloride at 20° C. to prepare a solution, and the specific viscosity of the solution is calculated by the formula (a) using an Ostwald viscometer. Then, the resulting specific viscosity is inserted into the formula (b) and the viscosity average molecular weight M is determined.

$$\text{Specific viscosity } (\eta_{sp})=(t-t_0)/t_0 \quad\quad (a)$$

($t_0$: dropping time in seconds of methylene chloride; and t: dropping time in seconds of sample solution)

$$\eta_{sp}/c=[\eta]+0.45\times[\eta]^2 c \quad\quad (b)$$

([$\eta$]: limit viscosity; [$\eta$]=$1.23\times10^{-4}M^{0.83}$; and c=0.7)

The polycarbonate resin preferably has a glass transition temperature (Tg) of 120° C. to 180° C., more preferably 140° C. to 160° C. The glass transition temperature is a value determined by differential scanning calorimetry (DSC) in conformity with JIS K 7121.

The polycarbonate resin preferably has a melt flow rate (MFR) of 5 to 100 g/10 min, more preferably 10 to 80 g/10 min, at 300° C. The MFR is a value determined at a pre-heating duration of 5 minutes, at a temperature of 300° C., and at a load of 5 kg in conformity with ASTM D1238.

The resin composition of the invention contains a fluorine-containing copolymer, and the fluorine-containing copolymer is a copolymer containing a polymerized unit based on tetrafluoroethylene (TFE) in an amount of 75% by mass or more of all polymerized units and at least one selected from the group consisting of a polymerized unit based on hexafluoropropylene (HFP) and a polymerized unit based on a perfluoro(alkyl vinyl ether) (PAVE) in an amount of 2% by mass or more of all polymerized units. The presence of the fluorine-containing copolymer in addition to the polycarbonate resin allows the resin composition of the invention to have excellent fluidity to provide a molded article having excellent tensile properties, flexural properties, low-temperature impact resistance, and incombustibility. The phrase "excellent tensile properties" means that the nominal tensile strain at break is high. The phrase "excellent flexural properties" means that the flexural stress and the flexural modulus are maintained at values similar to those of the polycarbonate resin.

The PAVE may be at least one selected from the group consisting of:

a PAVE represented by the following formula (1):

(wherein $Y^1$ is F or $CF_3$; $R^f$ is a C1-C5 perfluoroalkyl group; r is an integer of 0 to 5; and s is an integer of 0 to 5); and a PAVE represented by the following formula (2):

(wherein $X^{21}$s are the same as or different from each other, and are each H, F, or $CF_3$; $R^{21}$ is a C1-C6 linear or branched fluoroalkyl group optionally containing one or two atoms of at least one element selected from the group consisting of H, Cl, Br, and I, or a C5-C6 cyclic fluoroalkyl group optionally containing one or two atoms of at least one element selected from the group consisting of H, Cl, Br, and I).

In particular, the PAVE is preferably a PAVE represented by the following formula (1-1):

(wherein $R^f$ is a C1-C5 perfluoroalkyl group), more preferably perfluoro(methyl vinyl ether) (PMVE), perfluoro(ethyl vinyl ether) (PEVE), or perfluoro(propyl vinyl ether) (PPVE), still more preferably PPVE.

The copolymer preferably contains a polymerized unit (TFE unit) based on TFE in an amount of 98 to 75% by mass, more preferably 97 to 75% by mass, still more preferably 95 to 80% by mass, particularly preferably 92 to 85% by mass, of all polymerized units.

The copolymer also preferably contains at least one selected from the group consisting of a polymerized unit (HFP unit) based on HFP and a polymerized unit (PAVE unit) based on PAVE in an amount of 2 to 25% by mass, more preferably 3 to 25% by mass, still more preferably 5 to 20% by mass, particularly preferably 8 to 15% by mass, of all polymerized units. When the copolymer contains both the HFP unit and the PAVE unit, the sum of the amounts thereof preferably falls within the above range.

In the description, the amounts of the polymerized units of the copolymer can be calculated by any appropriate combination of NMR, FT-IR, elemental analysis, and X-ray fluorescence analysis in accordance with the types of the monomers.

The fluorine-containing copolymer is preferably a melt-fabricable fluororesin. The term "melt-fabricable" means that a polymer can be processed in a molten state using a conventional processing device such as an extruder or an injection molding device.

The fluorine-containing copolymer preferably has a melt flow rate (MFR) of 0.1 to 100 g/10 min, more preferably 0.5 to 80 g/10 min, at 300° C.

The MFR of the fluorine-containing copolymer is a value determined at a pre-heating duration of 5 minutes, at a temperature of 300° C., and at a load of 5 kg in conformity with ASTM D1238.

The fluorine-containing copolymer preferably has a melting point of 200° C. or higher and lower than 323° C., more preferably 230° C. to 320° C., still more preferably 250° C. to 315° C. The melting point is the temperature corresponding to the maximum value on a heat-of-fusion curve obtained by increasing the temperature at a rate of 10° C./min using a differential scanning calorimeter (DSC).

The fluorine-containing copolymer preferably includes at least one selected from the group consisting of a TFE/HFP copolymer (FEP), i.e., a copolymer containing a TFE unit and a HFP unit, and a TFE/PAVE copolymer (PFA), i.e., a copolymer containing a TFE unit and a PAVE unit, more preferably FEP.

The FEP is preferably a copolymer containing a TFE unit in an amount of 92 to 80% by mass and a HFP unit in an amount of 8 to 20% by mass, more preferably containing a TFE unit in an amount of 90 to 85% by mass and a HFP unit in an amount of 10 to 15% by mass, of all polymerized units. Too small an amount of the TFE unit tends to cause poor mechanical properties, while too large an amount thereof tends to cause an excessively high melting point and poor moldability.

The FEP may be a copolymer consisting only of a TFE unit and a HFP unit, or may be a copolymer containing a TFE unit, a HFP unit, and a polymerized unit based on a monomer copolymerizable with TFE and HFP.

When the FEP is a copolymer containing a TFE unit, a HFP unit, and a polymerized unit based on a monomer copolymerizable with TFE and HFP, preferably, the TFE unit represents less than 92% by mass to 75% by mass of all polymerized units, the HFP unit represents 8 to 20% by mass of all polymerized units, and the polymerized unit based on a monomer copolymerizable with TFE and HFP represents more than 0% by mass to 5% by mass of all polymerized units, more preferably the TFE unit represents less than 90% by mass to 80% by mass of all polymerized units, the HFP unit represents 10 to 15% by mass of all polymerized units, and the polymerized unit based on a monomer copolymerizable with TFE and HFP represents more than 0% by mass to 5% by mass of all polymerized units. The monomer copolymerizable with TFE and HFP may be PAVE or an alkyl perfluorovinyl ether derivative represented by $CF_2=CF-OCH_2-Rf^7$ (wherein $Rf^7$ is a C1-C5 perfluoroalkyl group). Particularly preferred is PAVE.

The FEP preferably has a melting point of 200° C. or higher and lower than 323° C., more preferably 220° C. to 320° C., still more preferably 250° C. to 315° C.

The FEP preferably has a MFR of 0.1 to 100 g/10 min, more preferably 0.5 to 80 g/10 min, still more preferably 1 to 70 g/10 min.

The FEP preferably has an initial pyrolysis temperature of 360° C. or higher. The initial pyrolysis temperature is more preferably 380° C. or higher, still more preferably 390° C. or higher.

The PFA is preferably a copolymer containing a TFE unit in an amount of 98 to 90% by mass and a PAVE unit in an amount of 2 to 10% by mass, more preferably containing a TFE unit in an amount of 97 to 92% by mass and a PAVE unit in an amount of 3 to 8% by mass, still more preferably containing a TFE unit in an amount of 96.5 to 93% by mass and a PAVE unit in an amount of 3.5 to 7% by mass, of all polymerized units. Too small an amount of the TFE unit tends to cause poor mechanical properties, while too large an amount thereof tends to cause an excessively high melting point and poor moldability.

The PFA may be a copolymer consisting only of a TFE unit and a PAVE unit, or may be a copolymer containing a TFE unit, a PAVE unit, and a polymerized unit based on a monomer copolymerizable with TFE and PAVE.

The PFA preferably has a melting point of 240° C. or higher and lower than 323° C., more preferably 260° C. to 320° C., still more preferably 280° C. to 315° C.

The PFA preferably has a MFR of 0.5 to 100 g/10 min, more preferably 1 to 90 g/10 min.

The PFA preferably has an initial pyrolysis temperature of 380° C. or higher. The initial pyrolysis temperature is more preferably 400° C. or higher, still more preferably 410° C. or higher.

The resin composition of the invention preferably has a ratio by mass of the polycarbonate resin to the fluorine-containing copolymer (polycarbonate resin/fluorine-containing copolymer) of 99/1 to 1/99. The ratio by mass is more preferably 97/3 to 30/70, still more preferably 94/6 to 40/60, particularly preferably 90/10 to 40/60.

The resin composition of the invention may further contain a different component other than the polycarbonate resin and the fluorine-containing copolymer to the extent that the effects of the invention are not impaired, if necessary. Examples of the different component include a variety of known additives to be added to conventional polycarbonate resin compositions, and specific examples thereof include a thermal stabilizer, a phosphorus-based stabilizer, an antistatic agent, a lubricant, a release agent, an ultraviolet absorber, a dye and pigment, a reinforcing material (e.g., glass fiber filler, carbon fiber filler), an anti-dripping agent, a filler, a flame retarder, and an elastomer for impact resistance improvement.

In order to achieve improved thermal stability of the resin composition of the invention and improved design of a molded article obtainable from the resin composition of the invention, the resin composition of the invention may contain any of additives used for such improvements. The following describes these additives in detail.

(I) Thermal Stabilizer

The resin composition of the invention may contain any of a variety of known stabilizers. Examples of the stabilizers include a phosphorus-based stabilizer and a hindered phenol-based antioxidant.

(i) Phosphorus-Based Stabilizer

The resin composition of the invention preferably contains a phosphorus-based stabilizer to the extent that the hydrolyzability is not facilitated. Such a phosphorus-based stabilizer can improve the thermal stability during production or during molding and can improve the mechanical properties, hue, and molding stability. Examples of the phosphorus-based stabilizer include phosphorous acid, phosphoric acid, phosphonous acid, phosphonic acid, esters thereof, and tertiary phosphines.

Specific, examples of phosphite compounds include triphenyl phosphite, tris(nonylphenyl)phosphite, tridecyl phosphite, trioctyl phosphite, trioctadecyl phosphite, didecyl monophenyl phosphite, dioctyl monophenyl phosphite, diisopropyl monophenyl phosphite, monobutyl ciphenyl phosphite, monodecyl diphenyl phosphite, monooctyl diphenyl phosphite, 2,2-methylenebis(4,6-di-tert-butylphenyl)octyl phosphite, tris(diethylphenyl)phosphite, tris(di-iso-propylphenyl)phosphite, tris(di-n-butylphenyl)phosphite, tris(2,4-di-tert-butylphenyl)phosphite, tris(2,6-di-tert-butylphenyl)phosphite, distearyl pentaerythritol diphosphite, bis(2,4-di-tert-butylphenyl)pentaerythritol diphosphite, bis(2,6-di-tert-butyl-4-methylphenyl)pentaerythritol diphosphite, bis(2,6-di-tert-butyl-4-ethylphenyl)pentaerythritol diphosphite, phenyl bisphenol. A pentaerythritol diphosphite, bis(nonylphenyl)pentaerythritol diphosphite, and dicyclohexyl pentaerythritol diphosphite.

Other phosphite compounds may also be used such as those reactive with a dihydric phenol and having a cyclic structure. Examples thereof include 2,2'-methylenebis(4,6-di-tert-butylphenyl) (2,4-di-tert-butylphenyl)phosphite, 2,2'-methylenebis(4,6-di-tert-butylphenyl) (2-tert-butyl-4-methylphenyl)phosphite, 2,2'-methylenebis(4-methyl-6-tert-butylphenyl)(2-tert-butyl-4-methylphenyl)phosphite, and 2,2'-ethylidenebis(4-methyl-6-tert-butylphenyl)(2-tert-butyl-4-methylphenyl)phosphite.

Examples of phosphate compounds include tributyl phosphate, trimethyl phosphate, tricresyl phosphate, triphenyl phosphate, trichlorophenyl phosphate, triethyl phosphate, diphenyl cresyl phosphate, diphenyl monoorthoxenyl phosphate, tributoxyethyl phosphate, dibutyl phosphate, dioctyl phosphate, and diisopropyl phosphate. Preferred are triphenyl phosphate and trimethyl phosphate.

Examples of phosphonite compounds include tetrakis(2,4-di-tert-butylphenyl)-4,4'-biphenylene diphosphonite, tetrakis(2,4-di-tert-butylphenyl)-4,3'-biphenylene diphosphonite, tetrakis(2,4-di-tert-butylphenyl)-3,3'-biphenylene diphosphonite, tetrakis(2,6-di-tert-butylphenyl)-4,4'-biphenylene diphosphonite, tetrakis(2,6-di-tert-butylphenyl)-4,3'-biphenylene diphosphonite, tetrakis(2,6-di-tert-butylphenyl)-3,3'-biphenylene diphosphonite, bis(2,4-di-tert-butylphenyl)-4-phenyl-phenyl phosphonite, bis(2,4-di-tert-butylphenyl)-3-phenyl-phenyl phosphonite, bis(2,6-di-n-butylphenyl)-3-phenyl-phenyl phosphonite, bis(2,6-di-tert-butylphenyl)-4-phenyl-phenyl phosphonite, and bis(2,6-di-tert-butylphenyl)-3-phenyl-phenyl phosphonite. Preferred are tetrakis(di-tert-butylphenyl)-biphenylene diphosphonite and bis(di-tert-butylphenyl)-phenyl-phenyl phosphonite, more preferred are tetrakis(2,4-di-tert-butylphenyl)-biphenylene diphosphonite and bis(2,4-di-tert-butylphenyl)-phenyl-phenyl phosphonite. Such phosphonite compounds are preferred because they can be used in combination with a phosphite compound containing an aryl group substituted with two or more alkyl groups.

Examples of phosphonate compounds include dimethyl benzenephosphonate, diethyl benzenephosphonate, and dipropyl benzenephosphonate. Examples of the tertiary phosphines include triethylphosphine, tripropyl phosphine, tributyl phosphine, trioctyl phosphine, triamyl phosphine, dimethyl phenyl phosphine, dibutyl phenyl phosphine, diphenyl methyl phosphine, diphenyl octyl phosphine, triphenyl phosphine, tri-p-tollyl phosphine, trinaphthyl phosphine, and diphenyl benzyl phosphine. Triphenyl phosphine is a particularly preferred tertiary phosphine. The phosphorus-based stabilizers may be used not only alone but also in combination of two or more. Particularly preferred are alkyl phosphate compounds such as trimethyl phosphate among the phosphorus-based stabilizers. In a preferred embodiment, such an alkyl phosphate compound is used in combination with a phosphite compound and/or a phosphonite compound.

(ii) Hindered Phenol-Based Stabilizer

The resin composition of the invention may contain a hindered phenol-based stabilizer. Such mixing can lead to an effect of reducing impairment of the hue during molding and deterioration of the hue in long-term use.

Examples of the hindered phenol-based stabilizer include α-tocopherol, butylhydroxytoluene, sinapyl alcohol, vitamin E, n-octadecyl-β-(4'-hydroxy-3',5'-di-tert-butylphenyl) propionate, 2-tert-butyl-6-(3'-tert-butyl-5'-methyl-2'-hydroxybenzyl)-4-methylphenyl acrylate, 2,6-di-tert-butyl-4-(N,N-dimethylaminomethyl)phenol, diethyl 3,5-di-tert-butyl-4-hydroxybenzylphosphonate, 2,2'-methylenebis(4-methyl-6-tert-butylphenol), 2,2'-methylenebis(4-ethyl-6-tert-butylphenol), 4,4'-methylenebis(2,6-di-tert-butylphenol), 2,2'-methylenebis(4-methyl-6-cyclohexylphenol), 2,2'-dimethylene-bis(6-α-methyl-benzyl-p-cresol), 2,2'-ethylidene-bis(4,6-di-tert-butylphenol), 2,2'-butylidene-bis(4-methyl-6-tert-butylphenol), 4,4'-butylidenebis(3-methyl-6-tert-butylphenol), triethylene glycol-N-bis-3-(3-tert-butyl-4-hydroxy-5-methylphenyl)propionate, 1,6-hexanediolbis[3-(3,5-di-tert-butyl-4-hydroxyphenyl)propionate], bis[2-tert-butyl-4-methyl-6-(3-tert-butyl-5-methyl-2-hydroxybenzyl) phenyl]terephthalate, 3,9-bis{2-[3-(3-tert-butyl-4-hydroxy-5-methylphenyl)propionyloxy]-1,1,-dimethylethyl}-2,4,8, 10-tetraoxaspiro[5,5]undecane, 4,4'-thiobis(6-tert-butyl-m-cresol), 4,4'-thiobis(3-methyl-6-tert-butylphenol), 2,2'-thiobis(4-methyl-6-tert-butylphenol), bis(3,5-di-tert-butyl-4-hydroxybenzyl)sulfide, 4,4'-di-thiobis(2,6-di-tert-butylphenol), 4,4'-tri-thiobis(2,6-di-tert-butylphenol), 2,2-thiodiethylenebis-[3-(3,5-di-tert-butyl-4-hydroxyphenyl) propionate], 2,4-bis(n-octylthio)-6-(4-hydroxy-3',5'-di-tert-butylanilino)-1,3,5-triazine, N,N'-hexamethylenebis-(3,5-di-tert-butyl-4-hydroxyhydrocinnamide), N,N'-bis[3-(3,5-di-tert-butyl-4-hydroxyphenyl)propionyl]hydrazine, 1,1,3-tris(2-methyl-4-hydroxy-5-tert-butylphenyl)butane, 1,3,5-trimethyl-2,4,6-tris(3,5-di-tert-butyl-4-hydroxybenzyl) benzene, tris(3,5-di-tert-butyl-4-hydroxyphenyl) isocyanurate, tris(3,5-di-tert-butyl-4-hydroxybenzyl) isocyanurate, 1,3,5-tris(4-tert-butyl-3-hydroxy-2,6-dimethylbenzyl)isocyanurate, 1,3,5-tris-2[3(3,5-di-tert-butyl-4-hydroxyphenyl)propionyloxy]ethyl isocyanurate, and tetrakis[methylene-3-(3',5'-di-tert-butyl-4-hydroxyphenyl)propionate]methane. These are easily available. The hindered phenol-based stabilizers may be used alone or in combination of two or more.

The amounts of the phosphorus-based stabilizer and the hindered phenol-based stabilizer added are preferably 0.0001 to 1 part by mass, more preferably 0.001 to 0.5 parts by mass, still more preferably 0.005 to 0.3 parts by mass, relative to 100 parts by mass in total of the polycarbonate resin and the fluorine-containing copolymer.

(iii) Different Thermal Stabilizer Other Than the Above

The resin composition of the invention may also contain a different thermal stabilizer other than the phosphorus-based stabilizer and the hindered phenol-based stabilizer. Preferred examples of the different thermal stabilizer include a lactone-based stabilizer typified by a reaction product of 3-hydroxy-5,7-di-tert-butyl-furan-2-one and o-xylene. Such a stabilizer is specifically described in JP H07-233160 A. Such a compound is commercially available as Irganox HP-136 (trademark, available from Ciba Specialty Chemicals Inc.), and this compound can be used. Also commercially available is a stabilizer prepared by mixing the compound with any of a variety of phosphite compounds and hindered phenol compounds. A preferred example thereof is Irganox HP-2921 available from the above company. The amount of the lactone-based stabilizer added is preferably 0.0005 to 0.05 parts by mass, more preferably 0.001 to 0.03 parts by mass, relative to 100 parts by mass in total of the polycarbonate resin and the fluorine-containing copolymer.

Examples of the different stabilizer include sulfur-containing stabilizers such as pentaerythritol tetrakis(3-mercaptopropionate), pentaerythritol tetrakis(3-laurylthiopropionate), and glycerol-3-stearyl thiopropionate. The amount of such a sulfur-containing stabilizer added is preferably 0.001 to 0.1 parts by mass, more preferably 0.01 to 0.08 parts by mass, relative to 100 parts by mass in total of the polycarbonate resin and the fluorine-containing copolymer.

The resin composition of the invention may optionally contain an epoxy compound. The epoxy compound is added so as to reduce mold corrosion. In general, every compound containing an epoxy functional group can be used. Preferred specific examples of the epoxy compound include 3,4-epoxycyclohexylmethyl-3',4'-epoxycyclohexyl carboxylate, an adduct of 2,2-bis(hydroxymethyl)-1-butanol with 1,2-epoxy-4-(2-oxiranyl)cyclohexane, a copolymer of methyl methacrylate and glycidyl methacrylate, and a copolymer of styrene and glycidyl methacrylate. The amount of the epoxy compound added is preferably 0.003 to 0.2 parts by mass, more preferably 0.004 to 0.15 parts by mass, still more preferably 0.005 to 0.1 parts by mass, relative to 100 parts by mass in total of the polycarbonate resin and the fluorine-containing copolymer.

(II) Flame Retarder

The resin composition of the invention may contain any of flame retarders. Mixing such a compound can improve the incombustibility. In addition, each of such compounds can improve the antistatic performance, fluidity, rigidity, and thermal stability, for example, in accordance with the properties of the compound. Examples of the flame retarder include (i) organic metal salt-based flame retarders such as alkali (alkaline earth) metal organosulfonates, metal organoborate-based flame retarders, and metal organostannate-based flame retarders, (ii) organophosphorus-based flame retarders such as organic group-containing monophosphate compounds, phosphate oligomer compounds, phosphonate oligomer compounds, phosphonitrile oligomer compounds, and phosphonic amide compounds, (iii) silicone-based flame retarders containing a silicone compound, and (iv) fibrillated PTFE. Preferred among these are organic metal salt-based flame retarders and organophosphorus-based flame retarders. These may be used alone or in combination of two or more.

(i) Organic Metal Salt-Based Flame Retarders

An organic metal salt compound is preferably an alkali (alkaline earth) metal salt of an organic acid containing 1 to 50 carbon atoms, preferably 1 to 40 carbon atoms, preferably an alkali (alkaline earth) metal salt of an organic sulfonic acid. This alkali (alkaline earth) metal salt of an organic sulfonic acid encompasses metal salts of a fluorine-substituted alkyl sulfonic acid such as a metal salt of a perfluoroalkyl sulfonic acid containing 1 to 10 carbon atoms, preferably 2 to 8 carbon atoms, and an alkali metal or an alkaline earth metal and a metal salt of an aromatic sulfonic acid containing 7 to 50 carbon atoms, preferably 7 to 40 carbon atoms, and an alkali metal or an alkaline earth metal. Examples of alkali metals that constitute the metal salts include lithium, sodium, potassium, rubidium, and caesium. Examples of alkaline earth metals include beryllium, magnesium, calcium, strontium, and barium. More preferred is an alkali metal. In order to achieve higher transparency, preferred among these alkali metals are rubidium and caesium which have a greater ion radius. Still, they are not versatile and are difficult to purify, so that they may finally be disadvantageous in terms of cost. In contrast, metals having a smaller ion radius such as lithium and sodium may be disadvantageous in terms of incombustibility. In consideration of these factors, an alkali metal to be contained in the alkali metal sulfonate can be selected as appropriate. Most preferred in any case is potassium sulfonate having excellent balance of properties. Such a potassium salt and an alkali metal sulfonate of another alkali metal may be used in combination.

Specific examples of the alkali metal salt of a perfluoroalkyl sulfonic acid include potassium trifluoromethanesulfonate, potassium perfluorobutanesulfonate, potassium perfluorohexanesulfonate, potassium perfluorooctanesulfonate, sodium pentafluoroethanesulfonate, sodium perfluorobutanesulfonate, sodium perfluorooctanesulfonate, lithium trifluoromethanesulfonate, lithium perfluorobutanesulfonate, lithium perfluoroheptanesulfonate, caesium trifluoromethanesulfonate, caesium perfluorobutanesulfonate, caesium perfluorooctanesulfonate, caesium perfluorohexanesulfonate, rubidium perfluorobutanesulfonate, and rubidium perfluorohexanesulfonate. These may be used alone or in combination of two or more. The carbon number of the perfluoroalkyl group is preferably within the range of 1 to 18, more preferably within the range of 1 to 10, still more preferably within the range of 1 to 8.

Particularly preferred among these is potassium perfluorobutanesulfonate. An alkali (alkaline earth) metal salt of a perfluoroalkyl sulfonic acid containing an alkali metal usually unavoidably contains fluoride ions (F$^-$) in no small quantities. Such fluoride ions may cause reduction in incombustibility, and thus the amount thereof is preferably reduced to as small as possible. The proportion of such fluoride ions can be measured by ion chromatography. The amount of the fluoride ions is preferably 100 ppm or less, more preferably 40 ppm or less, particularly preferably 10 ppm or less. In order to achieve good production efficiency, the amount is preferably 0.2 ppm or more. Such an alkali (alkaline earth) metal salt of a perfluoroalkyl sulfonic acid with a reduced amount of fluoride ions can be produced by a known production method together with a method of reducing the amount of fluoride ions contained in the materials in producing a fluorine-containing organic metal salt, a method of removing hydrogen fluoride which has been obtained as a result of reaction, with heat or gas generated during the reaction, or a method of reducing the amount of fluoride ions by a purification technique such as recrystallization or reprecipitation in production of a fluorine-containing organic metal salt. In particular, an organic metal salt-based flame retarder is relatively easily soluble in water. Thus, the organic metal salt-based flame retarder is preferably produced by dissolving the salt in deionized water, especially water having an electric resistance of 18 MΩ·cm or higher, i.e., having an electric conductivity of about 0.55 µS/cm or lower at a temperature higher than room temperature to perform washing, and then cooling the system to recrystallize the salt.

Specific examples of the alkali (alkaline earth) metal salt of an aromatic sulfonic acid include disodium diphenylsulfide-4,4'-disulfonate, dipotassium diphenylsulfide-4,4'-disulfonate, potassium 5-sulfoisophthalate, sodium 5-sulfoisophthalate, polysodium polyethylene terephthalate polysulfonate, calcium 1-methoxynaphthalene-4-sulfonate, disodium 4-dodecylphenyl ether disulfonate, polysodium poly(2,6-dimethylphenyleneoxide)polysulfonate, polysodium poly(1,3-phenyleneoxide)polysulfonate, polysodium poly(1,4-phenyleneoxide)polysulfonate, polypotassium poly(2,6-diphenylphenyleneoxide)polysulfonate, lithium poly(2-fluoro-6-butylphenyleneoxide)polysulfonate, potassium sulfonate of benzenesulfonate, sodium benzenesulfonate, strontium benzenesulfonate, magnesium benzenesulfonate, dipotassium p-benzenedisulfonate, dipotassium naphthalene-2,6-disulfonate, calcium biphenyl-3,3'-disulfonate, sodium diphenylsulfone-3-sulfonate, potassium diphenylsulfone-3-sulfonate, dipotassium diphenylsulfone-3,3'-disulfonate, dipotassium diphenylsulfone-3,4'-disulfonate, sodium α,α,α-trifluoroacetophenone-4-sulfonate, dipotassium benzophenone-3,3'-disulfonate, disodium thiophene-2,5-disulfonate, dipotassium thiophene-2,5-disulfonate, calcium thiophene-2,5-disulfonate, sodium benzothiophenesulfonate, potassium diphenylsulfoxide-4-sulfonate, a condensate of sodium naphthalenesulfonate with formalin, and a condensate of sodium anthracenesulfonate with formalin. Particularly preferred among these alkali (alkaline earth) metal salts of an aromatic sulfonic acid are potassium salts. Preferred among these alkali (alkaline earth) metal salts of an aromatic sulfonic acid are potassium diphenylsulfone-3-sulfonate and dipotassium diphenylsulfone-3,3'-disulfonate. Particularly preferred is a mixture of these salts (with a ratio by mass of the former and the latter of 15/85 to 30/70).

Preferred examples of organic metal salts other than the alkali (alkaline earth) metal salts of a sulfonic acid include alkali (alkaline earth) metal salts of a sulfuric acid ester and alkali (alkaline earth) metal salts of an aromatic sulfonamide. Examples of the alkali (alkaline earth) metal salts of a sulfuric acid ester include alkali (alkaline earth) metal salts of a sulfuric acid ester of a monohydric and/or polyhydric alcohol. Examples of such a sulfuric acid ester of a monohydric and/or polyhydric alcohol include methyl sulfate, ethyl sulfurate, lauryl sulfate, hexadecyl sulfate, a sulfuric acid ester of a polyoxyethylene alkyl phenyl ether, a mono, di, tri, or tetrasulfuric acid ester of pentaerythritol, a sulfuric acid ester of lauric acid monoglyceride, a sulfuric acid ester of palmitic acid monoglyceride, and a sulfuric acid ester of stearic acid monoglyceride. Preferred among these alkali (alkaline earth) metal salts of a sulfuric acid ester is an alkali (alkaline earth) metal salt of lauryl sulfate. Examples of the alkali (alkaline earth) metal salt of an aromatic sulfonamide include alkali (alkaline earth) metal salts of saccharin, N-(p-tollylsulfonyl)-p-toluenesulfoimide, N—(N'-benzylaminocarbonyl)sulfanilimide, and N-(phenylcarboxyl)sulfanilimide. The amount of the organic metal salt-based flame retarder is preferably 0.001 to 1 part by mass, more preferably 0.005 to 0.5 parts by mass, still more preferably 0.01 to 0.3 parts by mass, particularly preferably 0.03 to 0.15 parts by mass, relative to 100 parts by mass in total of the polycarbonate resin and the fluorine-containing copolymer.

(ii) Organophosphorus-Based Flame Retarder

Preferred examples of the organophosphorus-based flame retarder include aryl phosphate compounds and phosphazene compounds. These organophosphorus-based flame retarders have a plasticizing effect, and thus are advantageous in improving the molding processibility. An aryl phosphate compound to be used may be any of a variety of phosphate compounds conventionally known as flame retarders. The aryl phosphate compound more preferably includes one or two or more of phosphate compounds represented by the following formula [7]:

[Chem. 3]

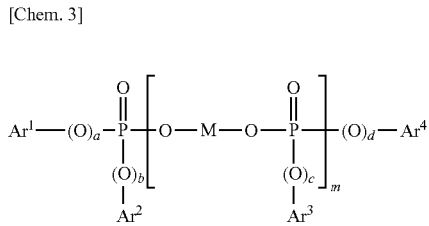

[7]

(wherein M is a divalent organic group derived from a dihydric phenol; $Ar^1$, $Ar^2$, $Ar^3$, and $Ar^4$ are each a monovalent organic group derived from a monohydric phenol; a, b, c, and d are each individually 0 or 1; m is an integer of 0 to 5, in the case of a mixture of phosphoric acid esters with different degrees m of polymerization, m is the average thereof and is 0 to 5).

The phosphate compound represented by the above formula may be a mixture of compounds having different m values. In the case of such a mixture, the average of m values is preferably within the range of 0.5 to 1.5, more preferably 0.8 to 1.2, still more preferably 0.95 to 1.15, particularly preferably 1 to 1.14.

Preferred specific examples of a dihydric phenol inducing the above M group include hydroquinone, resorcinol, bis(4-hydroxydiphenyl)methane, bisphenol A, dihydroxydiphenyl, dihydroxynaphthalene, bis(4-hydroxyphenyl)sulfone, bis(4-hydroxyphenyl)ketone, and bis(4-hydroxyphenyl)sulfide. Preferred among these are resorcinol, bisphenol A, and dihydroxydiphenyl.

Preferred specific examples of a monohydric phenol inducing $Ar^1$, $Ar^2$, $Ar^3$, and $Ar^4$ include phenol, cresol, xylenol, isopropyl phenol, butyl phenol, and p-cumyl phenol. Preferred among these are phenol and 2,6-dimethyl phenol.

Such a monohydric phenol may be substituted with a halogen atom. Specific examples of a phosphate compound containing a group induced from the monohydric phenol include tris(2,4,6-tribromophenyl)phosphate, tris(2,4-dibromophenyl)phosphate, and tris(4-bromophenyl)phosphate.

Preferred specific examples of a phosphate compound non-substituted with a halogen atom include monophosphate compounds such as triphenyl phosphate and tri(2,6-xylyl) phosphate, phosphate oligomers mainly containing resorcinol bisdi(2,6-xylyl)phosphate, phosphate oligomers mainly containing 4,4-dihydroxydiphenyl-bis(diphenyl phosphate), and phosphoric acid ester oligomers mainly containing bisphenol A-bis(diphenyl phosphate). The phrase "mainly containing" as used herein means a small amount of a different component having a different degree of polymerization may be present; this phrase more preferably means that the component of the formula [7] wherein m=1 represents 80% by mass or more, more preferably 85% by mass or more, still more preferably 90% by mass or more.

The phosphazene compound may be any of a variety of phosphazene compounds conventionally known as flame retarders, and is preferably a phosphazene compound represented by the following formula [8] or [9]:

[Chem. 4]

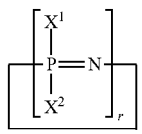

[8]

[Chem. 5]

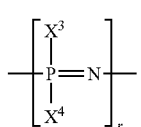

[9]

(wherein $X^1$, $X^2$, $X^3$, and $X^4$ are each hydrogen, a hydroxy group, an amino group, or an organic group free from a halogen atom; and r is an integer of 3 to 10).

Examples of the organic group free from a halogen atom represented by $X^1$, $X^2$, $X^3$, and $X^4$ in the formulas [8] and [9] include an alkoxy group, a phenyl group, an amino group, and an allyl group. Preferred among these is a cyclic phosphazene compound represented by the formula [8], particularly preferred is a cyclic phenoxyphosphazene represented by the formula [8] wherein $X^1$ and $X^2$ are phenoxy groups.

The amount of the organophosphorus-based flame retarder is preferably 1 to 50 parts by mass, more preferably 2 to 30 parts by mass, still more preferably 5 to 20 parts by mass, relative to 100 parts by mass in total of the polycarbonate resin and the fluorine-containing copolymer. Less than 1 part by mass of the organophosphorus-based flame retarder may fail to have an effect of giving flame retardation. More than 50 parts by mass thereof may cause strand breakage or surging during kneading and extrusion, impairing the productivity.

(iii) Silicone-Based Flame Retarder

A silicone compound to be used as a silicone-based flame retarder can improve the incombustibility as a result of a chemical reaction during combustion. This compound may be any of a variety of compounds conventionally proposed as flame retarders for an aromatic polycarbonate resin. A silicone compound binds to itself or to a component derived from the resin during its combustion to form a structure. This formation of the structure or a reducing reaction during formation of the structure seems to give a high flame retardation effect especially in the case of using a polycarbonate resin.

Thus, the silicone compound preferably contains a group highly reactive in such a reaction. Specifically, the silicone compound preferably contains a predetermined amount of at least one group selected from an alkoxy group and hydrogen (i.e., a Si—H group). The proportion of such a group (alkoxy group, Si—H group) is preferably within the range of 0.1 to 1.2 mol/100 g, more preferably within the range of 0.12 to 1 mol/100 g, still more preferably within the range of 0.15 to 0.6 mol/100 g. This proportion can be determined by measuring the amount of hydrogen or alcohol generated per unit mass of the silicone compound by alkali decomposition. The alkoxy group is preferably a C1-C4 alkoxy group, particularly preferably a methoxy group.

The silicone compound is usually constituted by any combination of the following four siloxane units, i.e., an M unit, a D unit, a T unit, and a Q unit.

M unit: monofunctional siloxane unit such as $(CH_3)_3SiO_{1/2}$, $H(CH_3)_2SiO_{1/2}$, $H_2(CH_3)SiO_{1/2}$, $(CH_3)_2(CH_2\!=\!CH)SiO_{1/2}$, $(CH_3)_2(C_6H_5)SiO_{1/2}$, and $(CH_3)(C_6H_5)(CH_2\!=\!CH)SiO_{1/2}$ D unit: bifunctional siloxane unit such as $(CH_3)_2SiO$, $H(CH_3)SiO$, $H_2SiO$, $H(C_6H_5)SiO$, $(CH_3)(CH_2\!=\!CH)SiO$, and $(C_6H_5)_2SiO$ T unit: trifunctional siloxane unit such as $(CH_3)SiO_{3/2}$, $(C_3H_7)SiO_{3/2}$, $HSiO_{3/2}$, $(CH_2\!=\!CH)SiO_{3/2}$, and $(C_6H_5)SiO_{3/2}$ Q unit: tetrafunctional siloxane unit represented by $SiO_2$ Specific examples of the structure of the silicone compound to be used for the silicone-based flame retarder include, in the form of rational formulas, Dn, Tp, MmDn, MmTp, MmQq, MmDnTp, MmDnQq, MmTpQq, MmDnTpQq, DnTp, DnQq, and DnTpQq. Preferred structures of the silicone compound among these are MmDn, MmTp, MmDnTp, MmDnQq, and more preferred structure is MmDn or MmDnTp.

The coefficients m, n, p, and q in the above rational formulas are each an integer of 1 or greater and represent the degrees of polymerization of the respective siloxane units, and the sum of the coefficients in each rational formula corresponds to the average degree of polymerization of the silicone compound. This average degree of polymerization is preferably within the range of 3 to 150, more preferably within the range of 3 to 80, still more preferably within the range of 3 to 60, particularly preferably within the range of 4 to 40. A value within a narrower range among the above ranges can lead to better incombustibility. As will be described later, a silicone compound containing a predetermined amount of an aromatic group has excellent transparency and hue. This results in good reflection light. When any of m, n, p, and q is 2 or greater, the siloxane unit with such a coefficient may include two or more types of siloxane units binding to hydrogen atoms or different organic residues.

The silicone compound may be linear or nay have a branched structure. The organic residue binding to a silicon atom is preferably an organic residue having a carbon number of 1 to 30, more preferably 1 to 20. Specific examples of the organic residue include alkyl groups such as a methyl group, an ethyl group, a propyl group, a butyl group, a hexyl group, and a decyl group, cycloalkyl groups such as a cyclohexyl group, aryl groups such as a phenyl group, and aralkyl groups such as a tolyl group. More preferred is a C1-C8 alkyl group, an alkenyl group, or an aryl group. Particularly preferred alkyl groups are C1-C4 alkyl groups such as a methyl group, an ethyl group, and a propyl group. The silicone compound to be used as a silicone-based flame retarder preferably contains an aryl group. In contrast, a silane compound and a siloxane compound serving as organic surface-treating agents for titanium dioxide pigments can achieve a better effect when containing no aryl group. Thus, they are clearly differentiated from the silicone-based flame retarder in such preferred embodiments. The silicone compound to be used as a silicone-based flame retarder may further contain a different reactive group other than the Si—H group and an alkoxy group. Examples of such a reactive group include an amino group, a carboxy group, an epoxy group, a vinyl group, a mercapto group, and a methacryloxy group.

The amount of the silicone-based flame retarder is preferably 0.01 to 20 parts by mass, more preferably 0.5 to 10 parts by mass, still more preferably 1 to 5 parts by mass, relative to 100 parts by mass in total of the polycarbonate resin and the fluorine-containing copolymer.

(iv) Polytetrafluoroethylene Having Fibrillatability (Fibrillatable PTFE)

The fibrillatable PTFE may be either a fibrillatable PTFE alone or a fibrillatable PTFE in a mixed state, i.e., a polytetrafluoroethylene-based mixture of fibrillatable PTFE particles and an organic polymer. The fibrillatable PTFE has a very high molecular weight and exhibits a tendency to bond to each other by an external influence such as shear force to become fibrils. The number average molecular weight thereof is within the range of 1500000 to tens of millions. The lower limit thereof is more preferably 3000000. The number average molecular weight can be calculated based on the melt viscosity of polytetrafluoroethylene at 380° C., as disclosed in JP H06-145520 A, for example. In other words, the fibrillatable PTFE has a melt viscosity, which is measured at 380° C. by the method disclosed in this literature, within the range of $10^7$ to $10^{13}$ poise, preferably within the range of $10^8$ to $10^{12}$ poise. This PTFE may be used in the form of solid or may be used in the form of an aqueous dispersion. The fibrillatable PTFE may be used in the form of a PTFE mixture with a different resin so as to improve the dispersibility in the resin and to achieve better incombustibility and mechanical properties.

As disclosed in JP H06-145520 A, also preferred is one having a core-shell structure including a fibrillatable PTFE core and a low molecular weight polytetrafluoroethylene shell.

Examples of commercially available products of the fibrillatable PTFE include Polyflon MPA FA500 and F-201L available from Daikin Industries, Ltd.

Examples of the fibrillatable PTFE in a mixed state include those obtained by any of the following methods: (1) a method of mixing an aqueous dispersion of fibrillatable PTFE and an aqueous dispersion or solution of an organic polymer to cause coprecipitation, thereby providing a coagglomerated mixture (a method disclosed in JP S60-258263 A and JP S63-154744 A, for example); (2) a method of mixing an aqueous dispersion of fibrillatable PTFE and dried organic polymer particles (a method disclosed in JP H04-272957 A); (3) a method of uniformly mixing an aqueous dispersion of fibrillatable PTFE and a solution of organic polymer particles and simultaneously removing the media from the mixture (a method disclosed in JP H06-220210 A and JP H08-188653 A, for example); (4) a method of polymerizing a monomer to form an organic polymer in an aqueous dispersion of fibrillatable PTFE (a method disclosed in JP H09-95583 A); and (5) a method of uniformly mixing an aqueous dispersion of PTFE and an organic polymer dispersion, polymerizing a vinyl-based monomer in the dispersion mixture, and then providing a mixture (a method disclosed in JP H11-29679 A).

(III) Dye and Pigment

The resin composition of the invention may further contain any of a variety of dyes and pigments. This can provide a molded article exhibiting a variety of design. Examples of dyes and pigments to be used in the invention include perylene-based dyes, cumarin-based dyes, thioindigo-based dyes, anthraquinone-based dyes, thioxanthone-based dyes, ferrocyanides such as Prussian blue, perinone-based dyes, quinoline-based dyes, quinacridone-based dyes, dioxazine-based dyes, isoindolinone-based dyes, and phthalocyanine-based dyes. The resin composition of the invention may further contain a metallic pigment to achieve better metallic color. A preferred metallic pigment is aluminum powder. Mixing a fluorescent brightener or other light-emitting fluorescent dye can provide a better design effect which brings out the luminescent color.

(IV) Fluorescent Brightener

The resin composition of the invention may contain a fluorescent brightener. The fluorescent brightener may be any one used for improving the hue of the resin, for example, to white or bluish white, and examples thereof include stilbene-based, benzimidazole-based, benzoxazole-based, naphthalimide-based, Rhodamine-based, cumarin-based, or oxazine-based compounds. Specific examples thereof include CI Fluorescent Brightener 219:1, Eastobrite OB-1 available from Eastman Chemical Co., and "Hakkol PSR" available from Showa Kagaku Kogyo Co., Ltd. The fluorescent brightener has a function to absorb energy of ultraviolet components of light beams and radiate this energy to visible components. The amount of the fluorescent brightener is preferably 0.001 to 0.1 parts by mass, more preferably 0.001 to 0.05 parts by mass, relative to 100 parts by mass in total of the polycarbonate resin and the fluorine-containing copolymer. More than 0.1 parts by mass thereof may have a small effect of improving the hue of the composition.

(V) Compound Having Heat-Absorbing Ability

The resin composition of the invention may contain a compound having a heat-absorbing ability. Preferred examples of this compound include phthalocyanine-based near-infrared absorbers, metal oxide-based near-infrared absorbers such as ATO, ITO, iridium oxide, ruthenium oxide, imonium oxide, and titanium oxide, a variety of metal compounds having an excellent near-infrared light absorbing ability such as metal boride-based or tungsten oxide-based near-infrared absorbers, including lanthanum boride, cerium boride, and tungsten boride, and carbon filler. A commercially available product of the phthalocyanine-based near-infrared absorbers is MIR-362 available from Mitsui Chemicals, Inc., which is easily available. Examples of the carbon filler include carbon black, graphite (including both natural and artificial), and fullerene. Preferred are carbon black and graphite. These may be used alone or in combination of two or more. The amount of the phthalocyanine-based near-infrared absorber is preferably 0.0005 to 0.2 parts by mass, more preferably 0.0008 to 0.1 parts by mass, still more preferably 0.001 to 0.07 parts by mass, relative to 100 parts by mass in total of a component A and a component B. The amount of the metal oxide-based near-infrared absorber, metal boride-based near-infrared absorber, and carbon filler is preferably within the range of 0.1 to 200 ppm (ratio by mass), more preferably 0.5 to 100 ppm, in the resin composition of the invention.

(VI) Light-Diffusing Agent

The resin composition of the invention may contain a light-diffusing agent to achieve a light-diffusing effect. Examples of the light-diffusing agent include polymer fine particles, low refractive index inorganic fine particles such as calcium carbonate particles, and composites thereof. These polymer fine particles are fine particles already known as a light-diffusing agent for a polycarbonate resin. Preferred examples thereof include acrylic crosslinked particles and silicone crosslinked particles typified by polyorganosilsesquioxane having a particle size of several micrometers. The light-diffusing agent may be in the form of spheres, discs, pillars, or indeterminate forms, for example. The spheres include not only the complete spheres but also deformed spheres, and the pillars include a cube. The light-diffusing agent is preferably in the form of spheres. The particle sizes of the particles are preferably as uniform as possible. The amount of the light-diffusing agent is preferably 0.005 to 20 parts by mass, more preferably 0.01 to 10 parts by mass, still more preferably 0.01 to 3 parts by mass, relative to 100 parts by mass in total of the polycarbonate resin and the fluorine-containing copolymer. Two or more light-diffusing agents may be used in combination.

(VII) Highly Light-Reflective White Pigment

The resin composition of the invention may contain a highly light-reflective white pigment to achieve a light-reflecting effect. Such a white pigment is particularly preferably a titanium dioxide pigment, especially titanium dioxide treated with an organic surface-treating agent such as silicone. The amount of the highly light-reflective white pigment is preferably 3 to 30 parts by mass, more preferably 8 to 25 parts by mass, relative to 100 parts by mass in total of the polycarbonate resin and the fluorine-containing copolymer. Two or more highly light-reflective white pigments may be used in combination.

(VIII) Ultraviolet Absorber

The resin composition of the invention may contain an ultraviolet absorber to achieve weather resistance. Specific examples of the ultraviolet absorber include benzophenone-based ones such as 2,4-dihydroxybenzophenone, 2-hydroxy-4-methoxybenzophenone, 2-hydroxy-4-octoxybenzophenone, 2-hydroxy-4-benzyloxybenzophenone, 2-hydroxy-4-methoxy-5-sulfoxybenzophenone, 2,2'-dihydroxy-4-methoxybenzophenone, 2,2',4,4'-tetrahydroxybenzophenone, 2,2'-dihydroxy-4,4'-dimethoxybenzophenone, 2,2'-dihydroxy-4,4'-dimethoxy-5-sodiumsulfoxybenzophenone, bis(5-benzoyl-4-hydroxy-2-methoxyphenyl)methane, 2-hydroxy-4-n-dodecyloxybenzophenone, and 2-hydroxy-4-methoxy-2'-carboxybenzophenone.

Specific examples of the ultraviolet absorber include benzotriazole-based ones such as 2-(2-hydroxy-5-methylphenyl)benzotriazole, 2-(2-hydroxy-5-tert-octylphenyl)benzotriazole, 2-(2-hydroxy-3,5-dicumylphenyl)phenylbenzotriazole, 2-(2-hydroxy-3-tert-butyl-5-methylphenyl)-5-chlorobenzotriazole, 2,2'-methylenebis[4-(1,1,3,3-tetramethylbutyl)-6-(2H-benzotriazol-2-yl)phenol], 2-(2-hydroxy-3,5-di-tert-butylphenyl)benzotriazole, 2-(2-hydroxy-3,5-di-tert-butylphenyl)-5-chlorobenzotriazole, 2-(2-hydroxy-3,5-di-tert-amylphenyl)benzotriazole, 2-(2-hydroxy-5-tert-octylphenyl)benzotriazole, 2-(2-hydroxy-5-tert-butylphenyl)benzotriazole, 2-(2-hydroxy-4-octoxyphenyl)benzotriazole, 2,2'-methylenebis(4-cumyl-6-benzotriazolephenyl), 2,2'-p-phenylenebis(1,3-benzoxazin-4-one), 2-(2-hydroxy-3-(3,4,5,6-tetrahydrophthalimidemethyl)-5-methylphenyl) benzotriazole, and polymers having a 2-hydroxyphenyl-2H-benzotriazole skeleton such as a copolymer of 2-(2'-hydroxy-5-methacryloxyethylphenyl)-2H-benzotriazole and a vinyl-based monomer copolymerizable with the monomer and a copolymer of 2-(2'-hydroxy-5-acryloxyethylphenyl)-2H-benzotriazole and a vinyl-based monomer copolymerizable with the monomer.

Specific examples of the ultraviolet absorber include hydroxyphenyl triazine-based ones such as 2-(4,6-diphenyl-1,3,5-triazin-2-yl)-5-hexyloxyphenol, 2-(4,6-diphenyl-1,3,5-triazin-2-yl)-5-methyloxyphenol, 2-(4,6-diphenyl-1,3,5-triazin-2-yl)-5-ethyloxyphenol, 2-(4,6-diphenyl-1,3,5-triazin-2-yl)-5-propyloxyphenol, and 2-(4,6-diphenyl-1,3,5-triazin-2-yl)-5-butyloxyphenol. Examples also include compounds obtained by replacing the phenyl group in the above compounds by a 2,4-dimethylphenyl group, such as 2-(4,6-bis(2,4-dimethylphenyl)-1,3,5-triazin-2-yl)-5-hexyloxyphenol. Specific examples of the ultraviolet absorber include cyclic imino ester-based ones such as 2,2'-p-phenylenebis(3,1-benzooxazin-4-one), 2,2'-m-phenylenebis(3,1-benzooxazin-4-one), and 2,2'-p,p'-diphenylenebis(3,1- benzooxazin-4-one). Specific examples of the ultraviolet absorber include cyano acrylate-based ones such as 1,3-bis-[(2'-cyano-3',3'-diphenylacryloyl)oxy]-2,2-bis[(2-cyano-3,3-diphenylacryloyl)oxy]methyl)propane and 1,3-bis-[(2-cyano-3,3-diphenylacryloyl)oxy]benzene. The ultraviolet absorber may be a polymer-type ultraviolet absorber that is in the form of a copolymer of an ultraviolet absorptive monomer and/or a light-stable monomer with a monomer such as an alkyl (meth)acrylate as a result of having a structure of a radically polymerizable monomer compound. Preferred examples of the ultraviolet absorptive monomer include compounds containing a benzotriazole skeleton, a benzophenone skeleton, a triazine skeleton, a cyclic imino ester skeleton, or a cyano acrylate skeleton in an ester substituent of a (meth)acrylic acid ester. In view of the ultraviolet absorbency, preferred among these are benzotriazole-based ones and hydroxyphenyl triazine-based ones. In view of the heat resistance and hue, preferred are cyclic imino ester-based ones and cyano acrylate-based ones. Specific examples thereof include "Kemisorb 79" available from Chemipro Kasei Kaisha, Ltd. and "Tinuvin 234" available from BASF Japan Ltd. The ultraviolet absorbers may be used alone or in the form of a mixture of two or more.

The amount of the ultraviolet absorber is preferably 0.01 to 3 parts by mass, more preferably 0.01 to 1 part by mass, still more preferably 0.05 to 1 part by mass, particularly preferably 0.05 to 0.5 parts by mass, relative to 100 parts by mass in total of the polycarbonate resin and the fluorine-containing copolymer.

(IX) Antistatic Agent

The resin composition of the invention may need to have antistatic performance in some cases. In such cases, the resin composition of the invention preferably contains an antistatic agent. Examples of the antistatic agent include (1) phosphonium organosulfonates such as phosphonium arylsulfonates typified by phosphonium dodecylbenzenesulfonate and phosphonium alkylsulfonates, and phosphonium borates such as phosphonium tetrafluoroborate. The amount of the phosphonium salt is appropriately 5 parts by mass or less, preferably within the range of 0.05 to 5 parts by mass, more preferably 1 to 3.5 parts by mass, still more preferably 1.5 to 3 parts by mass, relative to 100 parts by mass in total of the polycarbonate resin and the fluorine-containing copolymer.

Examples of the antistatic agent include (2) organosulfonic acid alkali (alkaline earth) metal salts such as lithium organosulfonates, sodium organosulfonates, potassium organosulfonates, caesium organosulfonates, rubidium organosulfonates, calcium organosulfonates, magnesium organosulfonates, and barium organosulfonates. These metal salts can also be used as flame retarders, as described above. Specific examples of these metal salts include metal salts of dodecylbenzenesulfonic acid and metal salts of perfluoroalkanesulfonic acid. The amount of the organosulfonic acid alkali (alkaline earth) metal salt is appropriately 0.5 parts by mass or less, preferably 0.001 to 0.3 parts by mass, more preferably 0.005 to 0.2 parts by mass, relative to 100 parts by mass in total of the polycarbonate resin and the fluorine-containing copolymer. Particularly preferred are salts of alkali metals such as potassium, caesium, and rubidium.

Examples of the antistatic agent include (3) ammonium organosulfonates such as ammonium alkylsulfonates and ammonium arylsulfonates. The amount of the ammonium salt is appropriately 0.05 parts by mass or less relative to 100 parts by mass in total of the polycarbonate resin and the fluorine-containing copolymer. Examples of the antistatic agent include (4) polymers containing a poly(oxyalkylene) glycol component as a component thereof such as polyether ester amide. The amount of the polymer is appropriately 5 parts by mass or less relative to 100 parts by mass in total of the polycarbonate resin and the fluorine-containing copolymer.

(X) Filler

The resin composition of the invention may contain any of a variety of filler known as reinforcing filler. Examples of such filler include a variety of platy filler and powdery filler. The platy filler means filler having a plate shape, including one having a rough surface and one in the form of curved plate. The powdery filler means filler having the shape other than the above, including an indeterminate form.

Preferred examples of the platy filler include glass flakes, talc, mica, kaolin, metal flakes, carbon flakes, and graphite, and such platy filler whose surface is covered with a different material such as metal or metal oxide. The particle size thereof is preferably within the range of 0.1 to 300 μm. For filler having a particle size within a region up to about 10 μm, the particle size corresponds to the median size (D50) in particle size distribution determined by X-ray transmission that is one of liquid sedimentation techniques. For filler having a particle size within the region of 10 to 50 μm, the particle size corresponds to the median size (D50) in the particle size distribution determined by laser diffraction/scattering. For filler having a particle size within the region of 50 to 300 μm, the particle size corresponds to the particle size determined by vibration sieving. The particle size is the value in the resin composition. The platy filler may be surface-treated with any of a variety of coupling agents such as silane-based, titanate-based, aluminate-based, or zirconate-based ones, and may be a granulated product obtained by a focusing treatment with any of a variety of resins such as olefinic resin, styrenic resin, acrylic resin, polyester-based resin, epoxy-based resin, and urethane-based resin or higher fatty acid esters, or by a compression treatment.

(XI) Different Resin and/or Elastomer

The resin composition of the invention may contain a small proportion of a different resin and/or elastomer to the extent that the effects of the invention are not impaired and can be achieved instead of part of the resin component. The amount of the different resin and/or elastomer added is preferably 20 parts by mass or less, more preferably 10 parts by mass or less, still more preferably 5 parts by mass or less, most preferably 3 parts by mass or less, relative to 100 parts by mass in total of the polycarbonate resin and the fluorine-containing copolymer.

Examples of the different resin include polyester resins such as polyethylene terephthalate and polybutylene terephthalate, and resins such as polyamide resin, polyimide resin, polyetherimide resin, polyurethane resin, silicone resin, polyphenylene ether resin, polyphenylene sulfide resin, polysulfone resin, polymethacrylate resin, phenol resin, and epoxy resin. Examples of the different elastomer include isobutylene-isoprene rubber, styrene-butadiene rubber, ethylene-propylene rubber, acrylic elastomers, polyester-based elastomers, polyamide-based elastomers, and core-shell elastomers such as MBS (methyl methacrylate-styrene-butadiene) rubber, MB (methyl methacrylate-butadiene) rubber, and MAS (methyl methacrylate-acrylonitrile-styrene) rubber.

(XII) Different Additive

The resin composition of the invention may contain any of other fluidity improvers, antibacterial agents, dispersants such as liquid paraffins, light-catalytic soil-resistant agent, and photochromic agents.

The resin composition of the invention can be produced by melt-kneading the polycarbonate resin and the fluorine-containing copolymer, for example. The melt-kneading temperature is not lower than the glass transition temperature of the polycarbonate resin as well as not lower than the melting point of the fluorine-containing copolymer, preferably 240° C. to 410° C., more preferably 260° C. to 380° C.

The melt-kneading is preferably performed with a high shear force applied to the polycarbonate resin and the fluorine-containing copolymer. This enables dispersion of the fluorine-containing copolymer in the polycarbonate resin in the order of submicrometers and can reduce the behavior of the fluorine-containing copolymer to agglomerate during molding. As a result, the resulting resin composition can have much better fluidity and can provide a molded article having much better tensile properties, flexural properties, low-temperature impact resistance, and incombustibility. Melt-kneading with a high shear force can be performed using a conventional twin-screw extruder or roll kneader. Still, melt-kneading is preferably performed using a high shear processor (reflux high-shear processor) including a kneading section provided with an internal return screw.

The internal return screw is a screw provided with a return hole along the central axis of the screw from the tip toward the back end. In a high-shear processor including a kneading section provided with an internal return screw, a molten resin charged into the kneading section is circulated such that it is sent toward the tip side along with the rotation of the internal return screw, flows into the return hole through an inlet on the tip to the back side and exits through an outlet, and is again sent to the tip side along with the rotation of the internal return screw. This circulation can highly disperse and mix the molten resin and reduce the size of the dispersed phase. Examples of the high-shear processor include devices disclosed in JP 2005-313608 A and JP 2011-046103 A.

The melt-kneading is preferably performed at a shear rate of 3500 sec$^{-1}$ (/sec) or higher. The shear rate means the shear rate when the resin passes through the return hole of the internal return screw. A shear rate within the above range can provide a high shear force to the polycarbonate resin and the fluorine-containing copolymer. A shear rate lower than the above shear rate may cause poor dispersibility, failing to provide desired performance. The shear rate is a value determined by the following formula:

$$s^{-1} = 4Q/\pi r^3$$

wherein $s^{-1}$: Shear rate (/sec)

Q: Amount of resin fed to return hole (mm$^3$/sec)

r: Radius of return hole (mm).

The shear rate is more preferably 5300 sec$^{-1}$ or higher and 10000 sec$^{-1}$ or lower. A shear rate higher than the above shear rate may cause significant impairment of the resin, failing to provide desired performance.

The melt-kneading duration is preferably 1 to 600 seconds, more preferably 5 to 100 seconds. A melt-kneading duration longer than the above duration may cause significant impairment of the resin, failing to provide desired performance. A melt-kneading duration shorter than the above duration may cause poor dispersibility, failing to provide desired performance.

The resin composition of the invention can have excellent fluidity and can provide a molded article having excellent tensile properties, flexural properties, low-temperature impact resistance, and incombustibility.

The resin composition of the invention preferably has a melt flow rate (MFR) of 1 to 200 g/10 min, more preferably 3 to 150 g/10 min, at 300° C. The resin composition having a MFR within the above range can have much better fluidity. A MFR lower than the above range may cause poor molding processibility. A MFR higher than the above range may fail to provide desired performance. The MFR is a value determined at a pre-heating duration of 5 minutes, at a temperature of 300° C., and at a load of 5 kg in conformity with ASTM D1238.

In the resin composition of the invention, preferably, the polycarbonate resin constitutes a continuous phase and the fluorine-containing copolymer constitutes a dispersed phase. In this case, the dispersed phase preferably has an average particle size of 0.01 to 2.5 μm. The resin composition including a dispersed phase with such a small particle size can have much better fluidity and can provide a molded article having much better tensile properties, flexural properties, low-temperature impact resistance, and incombustibility. Even after the melting procedure during molding, the fluorine-containing copolymer particles constituting the dispersed phase can maintain the particle sizes. Thus, the molded article after the molding can exhibit the aforementioned excellent mechanical properties, low-temperature impact resistance, and incombustibility. The maintenance of the particle size of the fluorine-containing copolymer particles is owing to the interaction between the polycarbonate resin and the fluorine-containing copolymer.

The average particle size is more preferably 0.1 to 2 μm.

The average particle size of the fluorine-containing copolymer in the resin composition can be determined by preparing a strand or sheet of the resin composition obtained from a melt-kneader and observing the cross section of a piece cut out of the strand or sheet using a confocal laser scanning microscope, an atomic force microscope (AFM), a scanning electron microscope (SEM), or a transmission electron microscope (TEM), or any combination thereof. For example, in the case of using a laser microscope, the resulting microscopic image can be analyzed using image analysis software (Image J). In the case of using an AFM, a light and shade image is obtained that indicates the difference obtained from the surface information of the polycarbonate resin in the continuous phase and the fluorine-containing copolymer in the dispersed phase. The brightness and darkness are classified by the tone, so that the image is binarized. The binarization point is the center level of the tone classification. This can provide an image with a clear contrast, which enables reading of the particle size of the fluorine-containing copolymer in the dispersed phase. In the case of using a SEM, a backscattered electron image is obtained. This image is processed to emphasize the contrast or to control the brightness and darkness, or to control both, thereby clarifying the fluorine-containing copolymer in the dispersed phase. This enables reading of the particle size of the fluorine-containing copolymer in the dispersed phase as in the case of AFM. In the case of TEM, like the case of SEM, the image is processed to control the contrast or the brightness and darkness, or both of them. This enables reading of the particle size of the fluorine-containing copolymer in the dispersed phase as in the cases of AFM and SEM. Any microscope can be selected among these so as to enable easier analysis for each resin composition.

The resin composition of the invention may be in any form such as pellets, powder, a sheet, a film, a tube, or an injection-molded article.

Molding the resin composition of the invention can provide a molded article. The method of molding the resin composition may be, but is not limited to, injection molding, extrusion molding, compression molding, blow molding, film formation, electric wire coating molding, or the like. The resin composition of the invention has excellent fluidity, and thus can more suitably be molded by injection molding.

The invention also relates to a molded article formed from the aforementioned resin composition of the invention, the molded article containing the polycarbonate resin that constitutes a continuous phase and the fluorine-containing copolymer that constitutes a dispersed phase, the dispersed phase having an average particle size of 0.01 to 2.5 µm. The molded article of the invention is characterized in that the dispersed phase has a small particle size within the above range. A dispersed phase having a particle size greater than the above range may fail to achieve desired performance especially in terms of mechanical properties. Even when the resin composition of the invention is molten during molding, the particle size of the fluorine-containing copolymer particles that constitute the dispersed phase hardly varies. Thus, the molded article of the invention has a dispersed phase with a small particle size. As a result, the molded article of the invention has excellent tensile properties, flexural properties, low-temperature impact resistance, and incombustibility.

The average particle size in the molded article of the invention is more preferably 0.1 to 2 µm.

The average particle size of the fluorine-containing copolymer in the molded article can be determined by observing the cross section of a piece cut out of the molded article using a confocal laser scanning microscope, an atomic force microscope (AFM), a scanning electron microscope (SEM), or a transmission electron microscope (TEM), or any combination thereof. For example, in the case of using a laser microscope, the resulting microscopic image can be analyzed using image analysis software (Image J). In the case of using an AFM, a light and shade image is obtained that indicates the difference obtained from the surface information of the polycarbonate resin in the continuous phase and the fluorine-containing copolymer in the dispersed phase. The brightness and darkness are classified by the tone, so that the image is binarized. The binarization point is the center level of the tone classification. This can provide an image with a clear contrast, which enables reading of the particle size of the fluorine-containing copolymer in the dispersed phase. In the case of using a SEM, a backscattered electron image is obtained. This image is processed to emphasize the contrast or to control the brightness and darkness, or to control both, thereby clarifying the fluorine-containing copolymer in the dispersed phase. This enables reading of the particle size of the fluorine-containing copolymer in the dispersed phase as in the case of AFM. In the case of TEM, like the case of SEM, the image is processed to control the contrast or the brightness and darkness, or both. This enables reading of the particle size of the fluorine-containing copolymer in the dispersed phase as in the cases of AFM and SEM. Any microscope can be selected among these so as to enable easier analysis for each molded article.

The resin composition of the invention and the molded article of the invention exhibit mechanical properties, incombustibility, and low-temperature impact resistance simultaneously at high levels. Thus, regardless of whether they are applied to outdoor use or indoor use, they can suitably be used in applications such as electronic/electrical equipment, camera parts, transport containers, playground equipment, household goods, housing equipment, building materials, living materials, infrastructure equipment, automobiles, OA and EE, and outdoor equipment.

EXAMPLES

The invention is described in more detail below with reference to, but not limited to, examples.

The physical properties were determined by the following methods.

<Amount of Monomer Units>

The amounts of the monomer units were determined by $^{19}$F-NMR.

<Glass Transition Temperature of Polycarbonate Resin>

The glass transition temperature of the polycarbonate resin was determined as the temperature corresponding to the maximum value on a heat-of-fusion curve obtained by increasing the temperature at a rate of 10° C./min using a differential scanning calorimeter (DSC).

<Molting Point of Fluorine-Containing Copolymer>

The melting point of the fluorine-containing copolymer was determined as the temperature corresponding to the maximum value on a heat-of-fusion curve obtained by increasing the temperature at a rate of 10° C./min using a differential scanning calorimeter (DSC).

<Melt Flow Rate (MFR) of Material Resin>

The MFR was determined as the mass (g/10 min) of the polymer that flowed out of a nozzle having an inner diameter of 2.09 mm and a length of 8 mm per 10 minutes after pre-heating at 300° C. for five minutes and at a load of 5 kg using a melt indexer in conformity with ASTM D1238.

In the examples and the comparative examples, the following materials were used.

Polycarbonate resin I: Panlite K-1300Y, available from Teijin Ltd., aromatic polycarbonate (glass transition temperature: 150° C., MFR: 15.8 g/10 min)

Polycarbonate resin II: Panlite L-1225WX, available from Teijin Ltd., aromatic polycarbonate (glass transition temperature: 150° C., MFR: 73.0 g/10 min)

Fluorine-containing copolymer I: Neoflon FEP, tetrafluoroethylene-hexafluoropropylene copolymer (composition ratio (ratio by mass): tetrafluoroethylene/hexafluoropropylene/perfluoro(propyl vinyl ether)=88.5%/10.5%/1.0%, MFR: 9.7 g/10 min, melting point: 260° C.)

Fluorine-containing copolymer II: Neoflon PFA, tetrafluoroethylene-perfluoro(propyl vinyl ether) copolymer (composition ratio (ratio by mass): tetrafluoroethylene/perfluoro(propyl vinyl ether)=96.5%/3.5%, melting point: 305° C.)

Fluorine-containing copolymer III: Neoflon FEP, tetrafluoroethylene-hexafluoropropylene copolymer (composition ratio (ratio by mass): tetrafluoroethylene/hexafluoropropylene=89.5%/10.5%, MFR: 2.8 g/10 min, melting point: 270° C.)

Fluorine-containing copolymer IV: Neoflon FEP, tetrafluoroethylene-hexafluoropropylene-perfluoro(propyl vinyl ether) copolymer (composition ratio (ratio by mass): tetrafluoroethylene/hexafluoropropylene/perfluoro(propyl vinyl ether)=88.5%/10.5%/1.0%, MFR: 13.0 g/10 min, melting point: 260° C.)

PTFE micropowder V: Lubron L-5, tetrafluoroethylene polymer

PTFE micropowder VI: Dyneon TF micropowder "TF9205", tetrafluoroethylene polymer Fluorine elastomer VII: tetrafluoroethylene-perfluoro (methyl vinyl ether) copolymer (composition ratio (ratio by mass): tetrafluoroethylene/perfluoro(methyl vinyl ether)=57.3%/42.7%)

Example 1

The polycarbonate resin I (80% by mass) and the fluorine-containing copolymer I (20% by mass) were dry blended and dried at 120° C. for five hours. The dried mixture was melt-kneaded using a reflux high-shear processor available from Niigata Machine Techno Co., Ltd. under the following predetermined conditions. The return hole used had a diameter of 2.5 mm.
Screw L/D: 1.8
Kneading temperature: 300° C.
Shear rate during kneading: 7000 sec$^{-1}$
Kneading duration: 10 seconds The resulting kneadate was pulverized into flakes using a gran-cutter. The resulting flake-shaped kneadate was dried at 120° C. for five hours, and then injection molded using a small injection molding device, whereby an ASTM multipurpose test specimen (127×12.7×3.2 mmt) and an ASTM type V dumbbell were obtained.

The physical properties were evaluated by the following methods. The results are shown in Table 1.

<Average Dispersed Particle Size>

The cross sections of specimens cut out of the kneadate (resin composition) obtained in Example 1 and of the multipurpose test specimen (molded article) obtained in Example 1 were photographed using a confocal laser scanning microscope and the resulting microscopic images were analyzed using image analysis software (Image J). In each image, the dispersed phases were selected and the equivalent circle diameters were determined. The equivalent circle diameters of 20 dispersed phases were calculated and averaged. Thereby, the average dispersed particle size and the average dispersed particle size after molding were determined.

<Fluidity (MFR of Resin Composition)>

The fluidity was determined as the mass (g/10 min) of the polymer that flowed out of a nozzle having an inner diameter of 2.09 mm and a length of 8 mm per 10 minutes at 300° C. and at a load of 5 kg using a melt indexer in conformity with ASTM D1238.

<Tensile Properties>

The nominal tensile strain at break of the dumbbell obtained in Example 1 was measured using an autograph in conformity with ASTM D638. For the measurement conditions, the test rate was 5 mm/min.

<Flexural Properties>

The flexural stress and the flexural modulus of the multipurpose test specimen obtained in Example 1 were measured using a universal material tester in conformity with ASTM D790. For the measurement conditions, the test rate was 2 mm/min.

<Low-Temperature Impact Resistance>

The multipurpose test specimen obtained in Example 1 was notched, and then the Charpy impact strength thereof was measured using an impact tester in conformity with ASTM D6110-02. The impact test was performed on the multipurpose test specimen immediately after the multipurpose test specimen was held in a −40° C. freezer for 24 hours and then taken out therefrom. The expression "NB" in the table means that the test specimen was not broken.

<Incombustibility>

The incombustibility of the multipurpose test specimen obtained in Example 1 was measured using a plastic combustion tester in conformity with the UL94V test.

Example 2

A resin composition, a test specimen, and a dumbbell were produced as in Example 1, except that the polycarbonate resin I (80% by mass) and the fluorine-containing copolymer II (20% by mass) were kneaded at a kneading temperature of 330° C., and the physical properties were evaluated as in Example 1. The results are shown in Table 1.

Examples 3 to 6

A resin composition, a test specimen, and a dumbbell were produced as in Example 1, except that the type of the polycarbonate resin, the type of the fluorine-containing copolymer, and the ratio by mass of the polycarbonate resin and the fluorine-containing copolymer were changed as shown in Table 1, and the physical properties were evaluated as in Example 1. The results are shown in Table 1.

Example 7

A resin composition, a test specimen, and a dumbbell were produced as in Example 1, except that the polycarbonate resin II (80% by mass) and the fluorine-containing copolymer I (20% by mass) were used and the shear rate during kneading was 8900 sec$^{-1}$, and the physical properties were evaluated as in Example 1. The results are shown in Table 1.

Comparative Examples 1 to 3

A test specimen and a dumbbell were produced as in Example 1, except that the type of the polycarbonate resin and the type of the fluorine-containing copolymer were changed as shown in Table 1, and the physical properties were evaluated as in Example 1. The results are shown in Table 1.

Comparative Example 4

A resin composition, a test specimen, and a dumbbell were produced as in Example 1, except that the polycarbonate resin I (80% by mass) and the PTFE micropowder V (20% by mass) were used, and the physical properties were evaluated as in Example 1. The results are shown in Table 1.

Comparative Example 5

A resin composition, a test specimen, and a dumbbell were produced as in Example 1, except that the polycarbonate resin I (80% by mass) and the PTFE micropowder VI (20% by mass) were used, and the physical properties were evaluated as in Example 1. The results are shown in Table 1.

Comparative Example 6

A resin composition, a test specimen, and a dumbbell were produced as in Example 1, except that the polycarbonate resin I (80% by mass) and the fluorine elastomer VII (20% by mass) were used, and the physical properties were evaluated as in Example 1. The results are shown in Table 1.

TABLE 1

|  |  | Example 1 | Example 2 | Example 3 | Example 4 | Example 5 | Example 6 | Example 7 |
|---|---|---|---|---|---|---|---|---|
| Fluorine-containing polymer | Type | I | II | III | IV | I | I | I |
|  | Composition ratio TFE (wt %) | 68.5 | 96.5 | 89.5 | 88.5 | 88.5 | 88.5 | 88.5 |
|  | HFP | 10.5 | 0.0 | 10.5 | 10.5 | 10.5 | 10.5 | 10.5 |
|  | PAVE | 1.0 | 3.5 | 0.0 | 1.0 | 1.0 | 1.0 | 1.0 |
|  | Fluidity (MFR) [g/10 min] measured at 300° C. | 9.7 | — | 2.8 | 13.0 | 9.7 | 9.7 | 9.7 |
| Polycarbonate resin | Type | I | I | I | I | I | I | II |
|  | Fluidity (MFR) [g/10 min] measured at 300° C. | 15.8 | 15.8 | 15.8 | 15.8 | 15.8 | 15.8 | 73.0 |
| Resin composition | Composition ratio Polycarbonate resin (wt %) | 80 | 80 | 80 | 80 | 90 | 60 | 80 |
|  | Fluorine-containing polymer | 20 | 20 | 20 | 20 | 10 | 50 | 20 |
| Physical properties of resin composition | Average dispersed particle size [μm] | 0.92 | 1.23 | 0.81 | 0.75 | 1.38 | 1.90 | 1.51 |
|  | Average dispersed particle size after molding [μm] | 1.00 | 1.58 | 1.04 | 0.78 | 1.51 | 1.95 | 1.39 |
|  | Fluidity (MFR) [g/10 min] | 53 | 80 | 57 | 76 | 48 | 74 | 111 |
|  | Nominal tensile resin at break [%] | 105 | 100 | 112 | 115 | 101 | 105 | 90 |
|  | Flexural stress [MPa] | 84 | 79 | 86 | 85 | 88 | 71 | 91 |
|  | Flexural module [MPa] | 2151 | 2084 | 2190 | 2185 | 2205 | 1980 | 2214 |
|  | Impact strength (−40° C.) [cJ/m$^2$] | 46 | 41 | 48 | 44 | 40 | 40 | 38 |
|  | Incombustibility | V-0 | V-0 | V-0 | V-0 | V-0 | V-0 | V-0 |

|  |  | Comparative Example 1 | Comparative Example 2 | Comparative Example 3 | Comparative Example 4 | Comparative Example 5 | Comparative Example 6 |
|---|---|---|---|---|---|---|---|
| Fluorine-containing polymer | Type | — | — | I | V | VI | VII |
|  | Composition ratio TFE (wt %) | — | — | 88.5 | 100 | 100 | 57.3 |
|  | HFP | — | — | 10.5 | 0 | 0 | 0 |
|  | PAVE | — | — | 1.0 | 0 | 0 | 42.7 |
|  | Fluidity (MFR) [g/10 min] measured at 300° C. | — | — | 9.7 | NA | NA | — |
| Polycarbonate resin | Type | I | I | — | I | I | I |
|  | Fluidity (MFR) [g/10 min] measured at 300° C. | 15.8 | 73.0 | — | 16.8 | 16.8 | 15.8 |
| Resin composition | Composition ratio Polycarbonate resin (wt %) | 100 | 100 | 0 | 80 | 80 | 80 |
|  | Fluorine-containing polymer | 0 | 0 | 100 | 20 | 20 | 20 |
| Physical properties of resin composition | Average dispersed particle size [μm] | — | — | — | 3.09 | 3.16 | 3.20 |
|  | Average dispersed particle size after molding [μm] | — | — | — | 5.75 | 4.22 | 5.47 |
|  | Fluidity (MFR) [g/10 min] | 16 | 73 | 10 | 85 | 86 | 53 |
|  | Nominal tensile resin at break [%] | 87 | 85 | 115 | 23 | 27 | 33 |
|  | Flexural stress [MPa] | 92 | 95 | 21 | 72 | 70 | 75 |
|  | Flexural module [MPa] | 2363 | 2356 | 570 | 1957 | 1834 | 1890 |
|  | Impact strength (−40° C.) [cJ/m$^2$] | 20 | 16 | NG | 15 | 21 | 32 |
|  | Incombustibility | Fail | Fail | V-0 | V-0 | V-0 | V-0 |

The invention claimed is:

1. A resin composition comprising a polycarbonate resin and a fluorine-containing copolymer,
the fluorine-containing copolymer being a copolymer containing a polymerized unit based on tetrafluoroethylene in an amount of 75% by mass or more of all polymerized units and at least one selected from the group consisting of a polymerized unit based on hexafluoropropylene and a polymerized unit based on a perfluoro(alkyl vinyl ether) in an amount of 2% by mass or more of all polymerized units,
wherein the polycarbonate resin constitutes a continuous phase and the fluorine-containing copolymer constitutes a dispersed phase,
wherein the dispersed phase has an average particle size of 0.01 to 2.5 μm, and
wherein the resin composition has a ratio by mass of the polycarbonate resin to the fluorine-containing copolymer (polycarbonate resin/fluorine-containing copolymer) of 94/6 to 40/60.

2. The resin composition according to claim 1,
wherein the fluorine-containing copolymer includes at least one selected from the group consisting of:
a copolymer containing the polymerized unit based on tetrafluoroethylene in an amount of 92 to 80% by mass of all polymerized units and the polymerized unit based on hexafluoropropylene in an amount of 8 to 20% by mass of all polymerized units;
a copolymer containing the polymerized unit based on tetrafluoroethylene in an amount of 98 to 90% by mass of all polymerized units and the polymerized unit based on a perfluoro(alkyl vinyl ether) in an amount of 2 to 10% by mass of all polymerized units; and
a copolymer containing the polymerized unit based on tetrafluoroethylene in an amount of less than 92% by mass to 75% by mass of all polymerized units, the polymerized unit based on hexafluoropropylene in an amount of 8 to 20% by mass of all polymerized units, and the polymerized unit based on a perfluoro(alkyl vinyl ether) in an amount of more than 0% by mass to 5% by mass of all polymerized units.

3. The resin composition according to claim 1,
wherein the fluorine-containing copolymer has a melt flow rate of 0.1 to 100 g/10 min at 300° C.

4. The resin composition according to claim 1, wherein the resin composition has a melt flow rate of 1 to 200 g/10 min at 300° C.

5. A molded article formed from the resin composition according to claim 1,
the molded article comprising the polycarbonate resin that constitutes a continuous phase and the fluorine-containing copolymer that constitutes a dispersed phase,
the dispersed phase having an average particle size of 0.01 to 2.5 μm.

* * * * *